Nov. 7, 1933.   G. P. G. RIBIS   1,934,376
HYDROMECHANICAL TRANSMISSION DEVICE
Filed Jan. 14, 1930   4 Sheets-Sheet 1
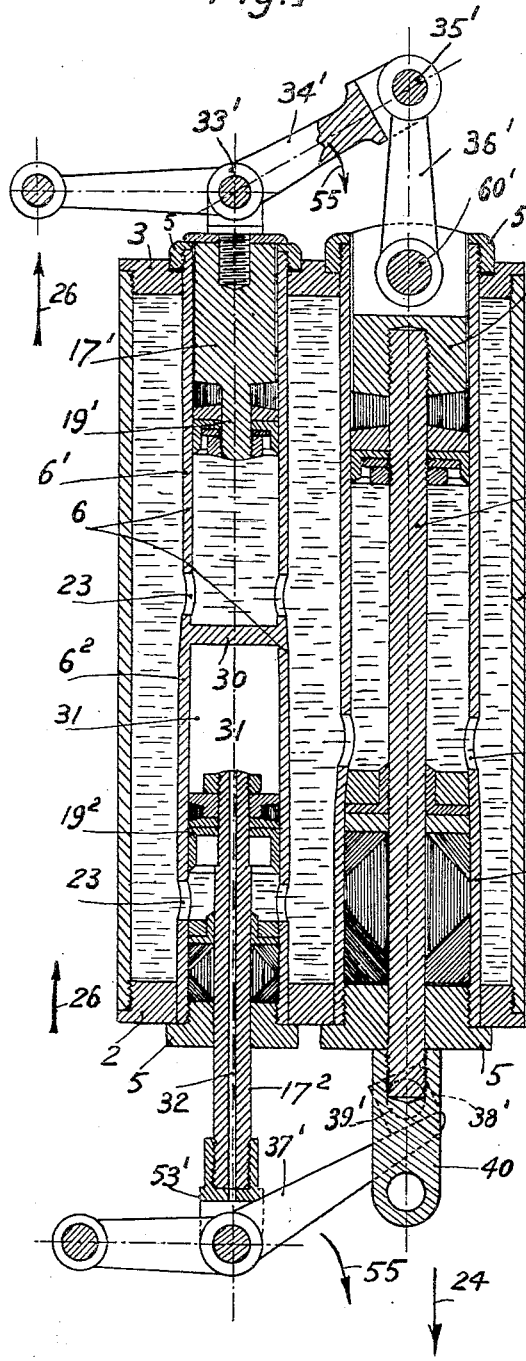
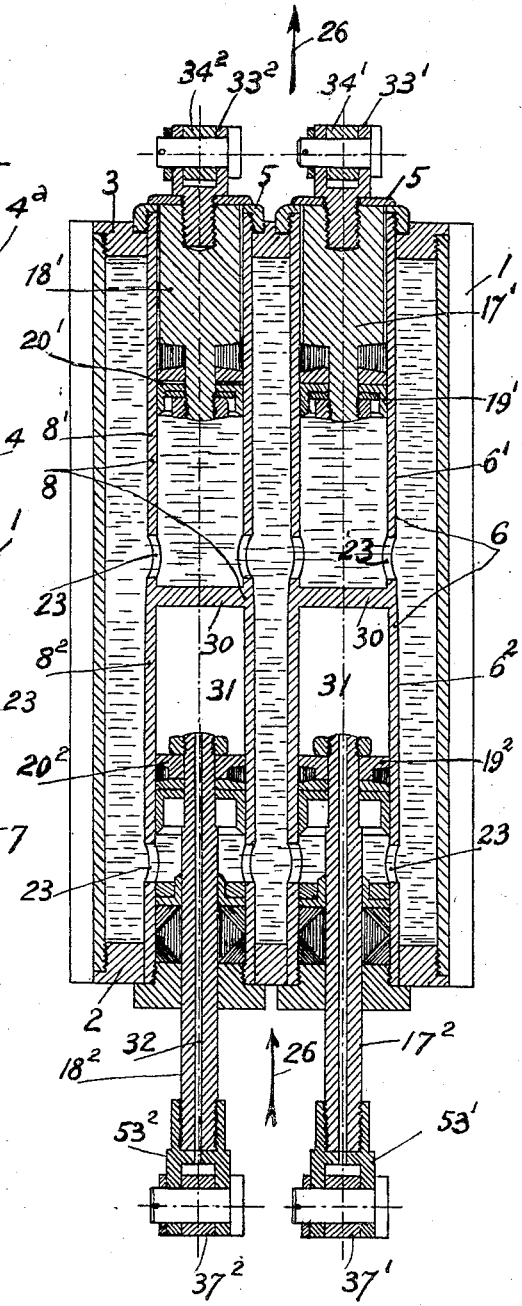
INVENTOR
Gustave Prosper Georges Ribis
by
Attorney Nov. 7, 1933.  G. P. G. RIBIS  1,934,376
HYDROMECHANICAL TRANSMISSION DEVICE
Filed Jan. 14, 1930  4 Sheets-Sheet 2

INVENTOR
Gustave Prosper Georges Ribis
by  
Attorney

Nov. 7, 1933.                G. P. G. RIBIS                1,934,376
                    HYDROMECHANICAL TRANSMISSION DEVICE
                      Filed Jan. 14, 1930          4 Sheets-Sheet 3
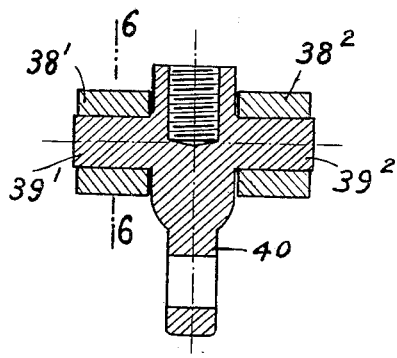
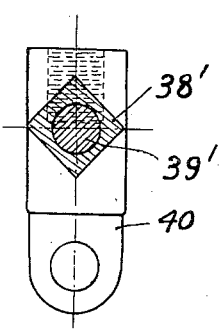
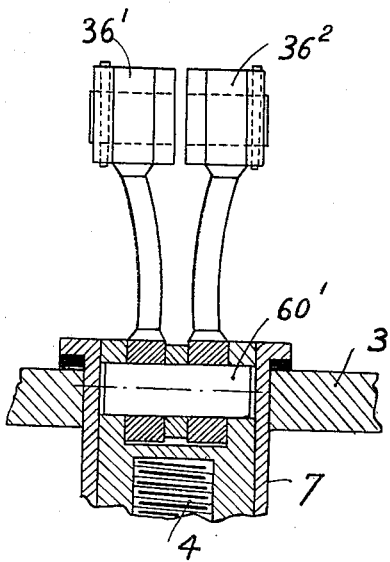
INVENTOR
Gustave Prosper Georges Ribis
Attorney

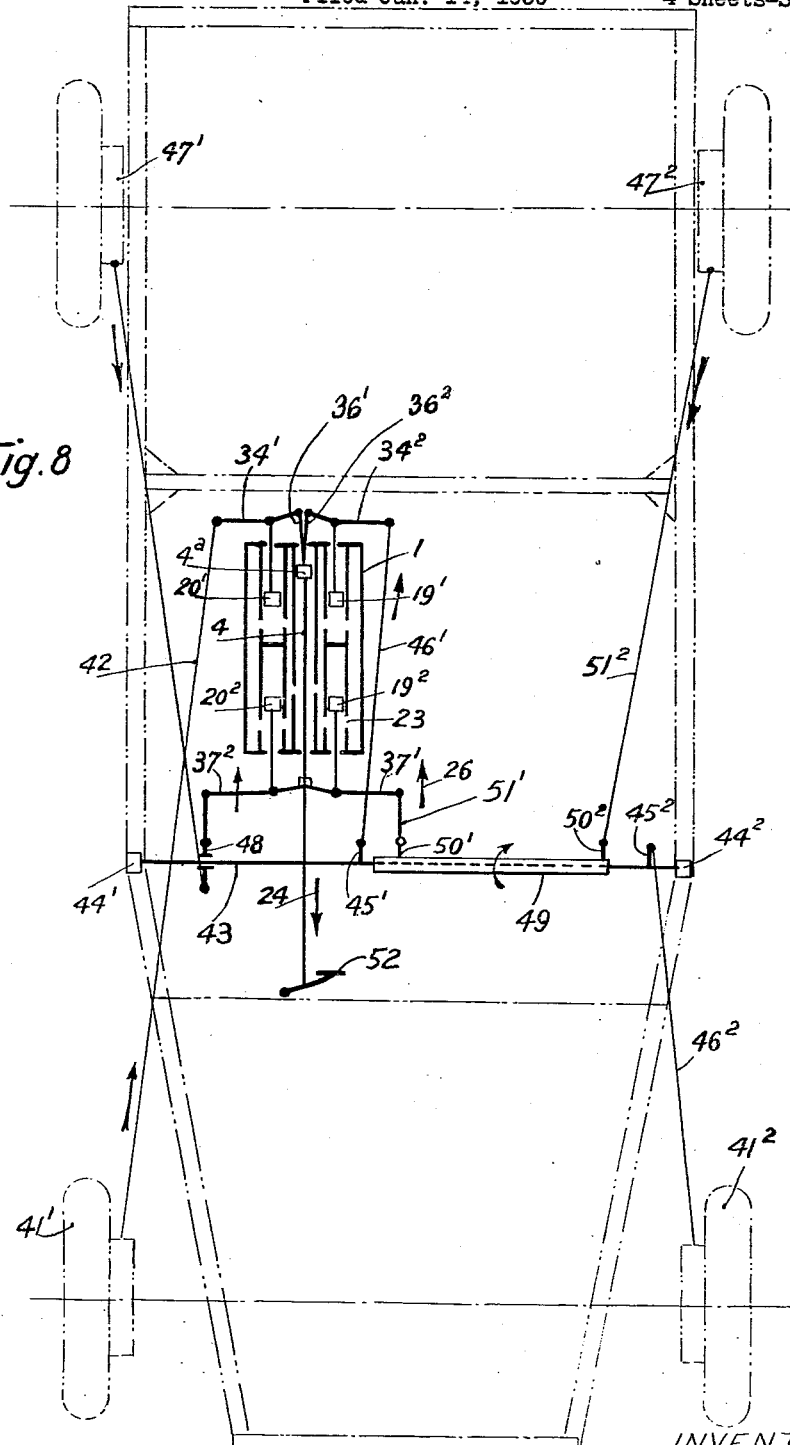

Patented Nov. 7, 1933

1,934,376

UNITED STATES PATENT OFFICE 1,934,376

HYDROMECHANICAL TRANSMISSION DEVICE

Gustave Prosper Georges Ribis, Paris, France

Application January 14, 1930, Serial No. 420,745, and in France January 18, 1929

13 Claims. (Cl. 188—204)

The present invention has for its object the transmission in a regular, certain, flexible and progressive manner of the energy from a driving member to a driven member, at a predetermined ratio of motion.

It has also for its object to ensure the transmission of the force from the driving member to several driven members in such manner as to permit different displacements of these various driven members.

It has also for its object to ensure the transmission of the force of the driving member to several driven members in such manner as to ensure the displacement and the regular action of each driven member whatever may be the play produced in the transmitting members.

It has also for its object to produce a hydromechanical transmission device which can operate even if there is produced an undesired loss of liquid, the arrangement then acting in a purely mechanical manner.

It has for its object, in particular, to ensure under the best possible conditions the instantaneous transmission of the braking effect on the brakes of an automobile.

It has also for its object to produce an equalized braking effect without any regulation being necessary, this regulation taking place automatically.

A hydro-mechanical transmission device in accordance with the invention permitting the attainment of the above-mentioned objects, presents characteristics which will be seen from the description following, as also from the claims annexed at the end of this description.

The form preferred for carrying out the invention is shown as an example on the annexed drawings in which:

Fig. 1 is a longitudinal section of this hydromechanical transmission device, the section being made through the axis of the primary cylinder and through the axis of an auxiliary cylinder.

Fig. 4 is a longitudinal section through the axis of the auxiliary cylinders, this section being made through the line 4—4 of Fig. 2.

Fig. 5 is a section of the cap fixed at the end of the primary piston rod, this section being made through the line 5—5 of Fig. 3.

Fig. 6 is another section of this cap through the line 6—6 of Fig. 5.

Fig. 7 is a partial section through the line 7—7 of Fig. 2.

Fig. 8 is a diagrammatic plan of hydro-mechanical device according to the invention applied to controlling brakes on the four wheels of an automobile.

Figure 2:
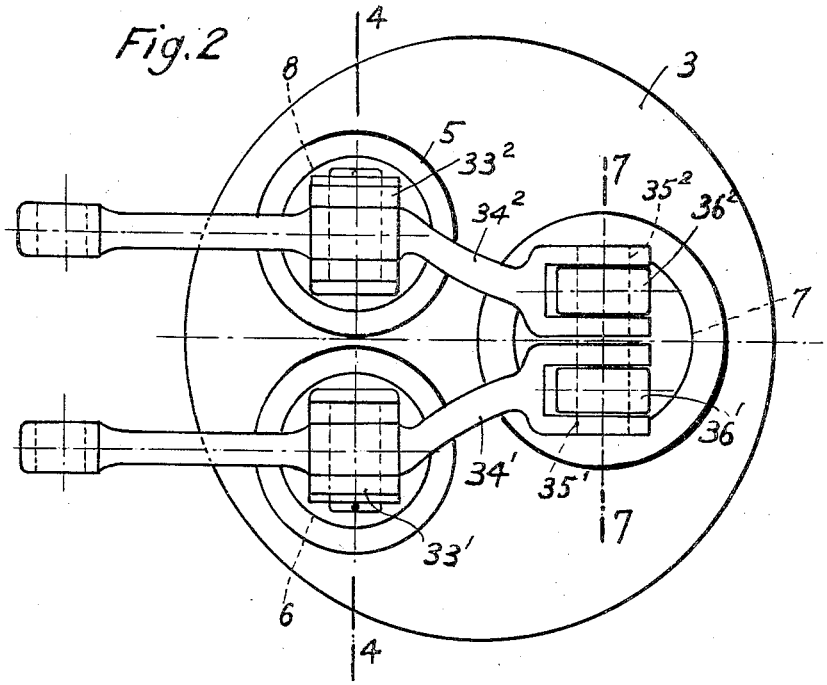
Figs. 2 and 3 are two end views of the extremities of this device.
Figure 3:
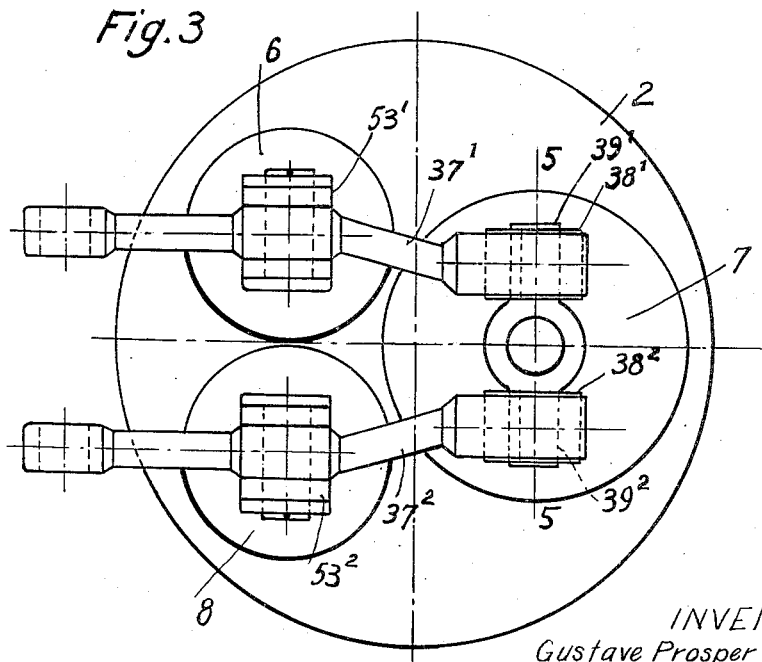

The hydro-mechanical device represented on the Figs. 1 to 7 comprises the following elements:

A casing 1 closed at its extremity by two end pieces 2 and 3 and cylinders 6, 7 and 8 having axes parallel to the axis of the casing 1.

The cylinders 6, 7 and 8 pass through the ends 2 and 3, and are fixed there, for example, by means of screwed rings 5 bearing by means of a tight joint on the ends 2 and 3.

The auxiliary cylinders 6 and 8 are themselves divided into two elementary cylinders $6^1$ $6^2$ and $8^1$ $8^2$ by a centre partition 30.

In these four auxiliary cylinders $6^1$ $6^2$ and $8^1$ $8^2$ thus obtained, move pistons $19^1$ $19^2$ and $20^1$ $20^2$ connected to the driven members as will be hereafter explained.

The casing 1 is filled with a liquid practically non-freezing which penetrates into the cylinders 7, $6^1$ $6^2$ and $8^1$ $8^2$ through apertures 23.

These apertures 23 which are made above the piston in the cylinders 7, $6^1$ and $8^1$ are, on the contrary, made underneath the piston in the cylinders $6^2$ and $8^2$ in such manner that the auxiliary pistons $19^1$, $19^2$, $20^1$ and $20^2$ move in the same direction; the rods $17^1$ $18^1$ of the pistons $19^1$ and $20^1$ receive thus a thrusting effort, while the rods $17^2$ and $18^2$ of the pistons $19^2$ $20^2$ have a tractive force exerted thereon.

The rods $17^2$ $18^2$ dip into the liquid penetrating through the orifices 23 into the corresponding cylinders $6^2$ and $8^2$; in order that the working surfaces of the corresponding auxiliary pistons may be practically the same, the cylinders $6^2$ $8^2$ have a larger section than those of the cylinders $6^1$ and $8^1$ in such manner as to compensate for the surface occupied by the rods $17^2$ $18^2$.

The free space 31 left between the face of the pistons $19^2$ and $20^2$ and the centre partitions 30 is placed in constant communication with the atmosphere, for example, through a channel 32 made in the rods $17^2$ $18^2$ of these pistons.

The rods $17^1$ $18^1$ of the pistons $19^1$ and $20^1$ are terminated by caps $33^1$ $33^2$ in which are hinged at their centre, levers $34^1$ $34^2$; one of the ends of these levers is jointed on an axis $35^1$ $35^2$ carried by a small connecting rod $36^1$, $36^2$ itself hinged at $60^1$ to the bottom of the primary piston 4a, these two axes $35^1$ $35^2$ being independent of each other.

In consequence of this arrangement, each lever $34^1$ $34^2$ forms with the corresponding short connecting rod $36^1$ $36^2$ an angle which may be altered in shape, thus permitting the control piston 4a to continue its movement, even if one of the levers 34¹ becomes fixed, and to thus ensure the action of the other lever 34² and the entrainment of the corresponding driven member.

A similar arrangement is provided for the rods 17² and 18² of the two other auxiliary pistons 19² and 20²; these rods are terminated by caps 53¹ 53² in which are hinged at their centre, levers 37¹ 37².

One of the extremities of these levers acts upon a block 38¹ 38² hinged on an axis 39¹ 39² carried by the bearing end 40 itself fixed to the end of the rod 4 of the primary piston 4a.

The free ends of the levers 34¹ 34² 37¹ 37² are intended to be mechanically connected each to a driven member with a view to any suitable purpose.

For example the whole of the hydro-mechanical transmission apparatus may be mounted on the chassis of an automobile (Fig. 8) and be used to control the brakes installed on this car.

The connection between the hydro-mechanical device and the jaws of the brakes may, for example, be carried out in the following manner:

The lever 34¹ controls directly the brake of the front wheel 41¹ by a cable 42.

The lever 34² controls the brake of the front wheel 41² through the intermediation of a shaft 43 rotating in bearings 44¹ 44² fixed to the chassis; on this shaft are suitably fixed reversing levers 45¹ 45² to which are attached respectively the connecting cables 46¹ 46².

On the other hand, the lever 37² controls the brake of the back wheel 47¹ through the intermediation of an oscillating lever 48 loosely mounted on the shaft 43.

Finally, the lever 37¹ controls the brake of the back wheel 47² through the intermediation of a socket 49 loosely mounted on the shaft 43. This socket 49 carries reversing levers 50¹ and 50² to which are attached respectively the connecting cables 51¹ and 51².

The rod 4 of the primary piston 4a is mechanically connected to a control pedal 52 arranged on the chassis of the car.

The hydro-mechanical device thus installed operates in the following manner:

When it is desired to apply the brakes, a force is exerted on the pedal 52 which displaces the rod 4 according to the arrow 24.

The piston 4a forces the liquid out of the cylinder 7 through the apertures 23, and as the volume of the liquid in the casing 1 is constant, the auxiliary pistons 19¹ 19² and 20¹ and 20² are moved according to the arrows 26.

The levers 34¹ 34², 37¹ 37² actuated by these auxiliary pistons then exert a tractive force on the respective brakes with which they are connected. These brakes undergo simultaneous displacements and are, in principle, applied at the same time on their drum, thus ensuring an equal and simultaneous braking of the four wheels.

If any play has been caused in the transmission members of the various driven parts, the arrangement according to the invention nevertheless operates in a perfectly regular manner as hereafter explained.

When the jaws or other braking members of one of the brakes have made contact with the drum of the corresponding wheel, for example, the front wheel 41¹, the lever 34¹ of the hydro-mechanical device to which is attached the control of this brake, becomes fixed.

The piston 19¹ then offers a certain resistance to the mass of liquid in such manner that all the force transmitted by the piston 4a is distributed at this moment over the three other pistons 19² 20¹ and 20², and so on, until the four friction devices are in contact with the drums of the four wheels of the vehicle.

When all the brakes are applied, the levers 34¹ 34², 37¹ 37² exercise, for a given effort applied on the rod 4, efforts perfectly constant on each of the brakes, whatever may be the wear of the friction members and whatever may be the play in the joints of the triangular parts controlling these brakes.

In this way, a device for transmitting energy controlled hydro-mechanically is obtained having at the same time all the advantages of hydraulically controlled apparatuses and of mechanically controlled apparatuses.

It may be profitable to compare the action of one piston with two pistons in devices embodying the invention.

In the case of one piston, the amount of liquid interposed between the driving piston 4a and the driven piston 17¹ is constant and invariable, so that a displacement of the driving piston as at $d$ results in a displacement D of the driven piston, thus:

$$d\, s = D\, S$$

$s$ being the portion of the cylinder in which the piston moves, and $S$ being the portion of the cylinder through which the driven piston is displaced.

Hence $$\frac{d}{D} = \frac{S}{s}$$

or in other words, the displacements are inversely proportional to the cylinder portions involved.

The operation of the apparatus when provided with two driven pistons fits this case, when one of the two pistons is stalled or has reached the end of its stroke.

When several pistons are considered, the displacement $d$ of the driving piston causes displacements $d_1$, $d_2$, etc., of the driven pistons in such manner that $$ds = D_1 S_1 + D_2 S_2 + \text{etc.,}$$

$S_1$ $S_2$ being the cylinder portions of the driven pistons. $S_1$ $S_2$ being determined, the sum of the displacements of the driven pistons retains a constant ratio to the displacement of the driving piston.

Particularly in the case of $$S_1 = S_2 = S_3 \text{etc.,} = S_m$$
$$ds = S_m(D_1 + D_2 + D_3 + \text{etc.,})$$

or $$\frac{D_1 + D_2 + D_3 + \text{etc.}}{d} = \frac{s}{S_m}$$

is found to be the result.

Thus, if the driving piston 4a is displaced by an amount $d$ and if the driven piston encounters the same resistance, each of the driven pistons is displaced by the amount $D_1$, $D_2$, $D_3$, etc., which depends equally upon the piston sections involved, that is to say an amount determined by the particular apparatus concerned.

It can therefore be stated in general that the resisting forces may be assumed to be equal for all of the driven pistons, and that the apparatus herein produces a determined transformation of movement between the driving piston and the driven pistons. To this transformation of movement which is purely hydraulic, is furthermore added a mechanical amplification of the displacements of the driving piston, due to the presence of the connecting member 34 which is interposed between the driving piston 4a and the driven piston 17₁, this action being checked and controlled by the constant volume of the liquid.

Hence, the two pistons move in opposite directions and the movement of the control head is amplified in relation to the movement of the driving piston 4a, due to the fact that pivot 33 of the connecting member is itself movable. The movement of the piston being determined, it naturally follows that the amplification which results from the opposition of said movements is also determined.

It will be seen from the Figure 8 that the installation of the transmission device according to the application, does not necessitate any piping connected on to the casing 1; thus, the inconveniences of the fully hydraulic devices already known and having numerous pipe connections of great length and always uncertain as to being water-tight, are avoided. On the other hand, a transmission device is obtained much more flexible and more efficient than the transmission devices which are entirely mechanical.

It will be also noted that in case of accidental loss of the liquid contained in the casing 1, the arrangement can still operate and even ensure the transmission of the movements received by the rod 4 of the primary piston 4a.

If it be supposed that the casing 1 has lost all the liquid, then when the pedal 52 is actuated, the rod 4 still moves according to the arrow 24. On the other hand, the levers 34¹ 34² actuated by the small connecting rods 36¹ 36² are deflected in the caps 33¹ 33² according to the arrow 55 and the result is that these levers exercise a tractive effort on the brake rods according to the arrow 26.

On the other hand, the levers 37¹ 37² being in engagement with the blocks 38¹ 38² which are fixed on the rod 4, also pivot in their respective cap 53¹ 53² according to the arrow 55 thus exercising a pull on the brake rod according to the arrow 26, the pistons 19² and 20² being capable of bearing on the corresponding partitions 30.

Thus, a transmission for the control of the brakes which ensures in any case the transmission to the brakes of the force exerted on the control member, is obtained, even in the case of the accidental loss of the liquid contained in the casing.

I claim:

1. In a hydro-mechanical transmission device: a water-tight casing containing a constant volume of liquid; a control member acting on this liquid; a driven member, a cooperating group of transmission members interposed between the control member and the driven member, said transmission members being in contact with the constant volume of liquid in such manner that this constant volume of liquid when displaced under the action of the control member and acting on said transmission members will automatically produce a determined ratio of transmission of movement between the control member and the driven member.

2. In a hydro-mechanical transmission device: a water-tight casing containing a constant volume of liquid; a water-tight primary cylinder communicating with the casing; a primary piston moving in the primary cylinder and acting on the constant volume of liquid; a driven member; a water-tight auxiliary cylinder communicating with the casing; an auxiliary piston moving in the auxiliary cylinder this auxiliary piston being in contact with the constant volume of liquid; connecting members connecting the driven member, the primary piston and the auxiliary piston in such manner that this constant volume of liquid being displaced under the action of the primary piston and acting through the auxiliary piston on the connecting member produces automatically a determined ratio of transmission of movement between the primary piston and the driven member.

3. In a hydro-mechanical transmission device: a water-tight casing containing a constant volume of liquid; a controlling member acting on this liquid; several independent driven members; a cooperating group of transmission members interposed between the control member and the driven members, said transmission members being in communication with the constant volume of liquid in such manner that this constant volume of liquid being displaced by the action of the control member and acting on said transmission members will produce automatically a determined ratio of transmission of movement between the control member and the various driven members and, on the other hand, these various driven members, upon encountering different resistances, are adapted to be differently displaced so as to provide for taking up play and equalizing the forces involved.

4. In a hydro-mechanical transmission device: a water-tight casing containing a constant volume of liquid; a water-tight primary cylinder communicating with the casing, a primary piston moving in the primary cylinder and acting on the constant volume of liquid, several driven members; water-tight auxiliary cylinders communicating with the casing; auxiliary pistons moving in auxiliary cylinders and being in contact with the constant volume of liquid, continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

5. In a hydro-mechanical transmission device: a water-tight casing containing a constant volume of liquid; a water-tight primary cylinder mounted in this casing and having means of communication for the passage of liquid; a primary piston moving in the primary cylinder and acting on the constant volume of liquid; a water-tight auxiliary cylinder also mounted in this casing and having means of communication for the passage of the liquid; an auxiliary piston moving in the auxiliary cylinder this auxiliary piston being in contact with the constant volume of liquid, continuous connecting members connecting the driven member, the primary piston and the auxiliary piston in such manner that this constant volume of liquid being displaced under the action of the primary piston and acting through the auxiliary piston on the connecting member produces automatically a definite ratio of transmission of movement between the primary piston and the driven member.

6. In a hydro-mechanical transmission device: a water-tight casing containing a constant volume of liquid; a water-tight primary cylinder mounted in this casing and having means of communication for the passage of the liquid; a primary piston moving in the primary cylinder and acting on the constant volume of liquid; several driven members; water-tight auxiliary cylinders fitted in the casing and having also means of communication for the passage of the liquid; auxiliary pistons moving in these auxiliary cylinders and being in contact with the constant volume of liquid; continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members; water-tight auxiliary cylinders arances, are adapted to be differently displaced so as to provide for taking up play and equalizing the forces involved.

7. In a hydro-mechanical transmission device: a water-tight casing containing a constant volume of liquid; a water-tight primary cylinder communicating with the casing; a primary piston moving in the primary cylinder and acting on the constant volume of liquid; several driven members; water-tight auxiliary cylinders arranged end to end and communicating with the casing; auxiliary pistons moving in these auxiliary cylinders and being in contact with the constant volume of liquid; continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

8. In a hydro-mechanical transmission device: a water-tight casing containing a constant volume of liquid; a water-tight primary cylinder mounted in this casing and having means of communication for the passage of the liquid; a primary piston moving in the primary cylinder and acting on the constant volume of liquid; several driven members; auxiliary water-tight cylinders arranged end to end, fitted in the casing and having also means of communication for the passage of the liquid; auxiliary pistons moving in these auxiliary cylinders and being in contact with the constant volume of liquid; continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

9. In a hydro-mechanical transmission device: a water-tight casing containing a constant volume of liquid; a water-tight primary cylinder communicating with the casing; a primary piston moving in the primary cylinder and acting on the constant volume of liquid; several driven members; water-tight auxiliary cylinders arranged end to end and communicating with the casing, auxiliary pistons moving in these auxiliary cylinders before-mentioned, these cylinders having means of communication for the passage of the liquid, these means of communication being arranged in such manner that the liquid coming from the casing and penetrating into the auxiliary cylinders transmits a forward thrust on to one of the pistons whilst it exerts a tractive force on the other piston; continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

10. In a hydro-mechanical transmission device, a water-tight casing containing a constant volume of liquid, a water-tight primary cylinder communicating with the casing, a primary piston moving in the primary cylinder and acting on the constant volume of liquid, various driven members, water-tight auxiliary cylinders, of different section arranged end to end, and communicating with the casing, auxiliary pistons moving in these auxiliary cylinders before-mentioned, these cylinders having means of communication for the passage of the liquid, these means of communication being arranged in such manner that the liquid transmits a forward thrust on one of the pistons whilst it transmits a tractive force on the other piston this thrust and tractive force being equal owing to the fact that the useful surface of the pistons is the same in spite of the presence of one of the piston rods in the liquid chamber, continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

11. In a hydro-mechanical transmission device, a water-tight casing containing a constant volume of liquid, a water-tight primary cylinder communicating with the casing a primary piston moving in the primary cylinder and acting on the constant volume of liquid, several driven members, a water-tight auxiliary cylinder being divided into two elementary cylinders by a centre partition, auxiliary pistons moving in these two elementary cylinders and being in contact with the constant volume of liquid, continuous connecting members connecting respectively each driven member, the primary piston and one of the auxiliary pistons in such manner that this constant volume of liquid being displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

12. In a hydro-mechanical transmission device, a water-tight casing containing a constant volume of liquid, a water-tight primary cylinder communicating with the casing a primary piston moving in the primary cylinder and acting on the constant volume of liquid, a driven member, a water-tight auxiliary cylinder communicating with the casing, an auxiliary piston moving in the auxiliary cylinder this auxiliary piston being in contact with the constant volume of liquid, an oscillating lever hinged on the auxiliary piston before-mentioned, this oscillating lever being controlled by the primary piston in the reverse direction to the displacement of the auxiliary piston, and being itself adapted to control the corresponding driven member, in such manner that this constant volume of liquid being displaced under the action of the primary piston and acting through the auxiliary piston on the oscillating lever produces automatically a determined ratio of transmission of movement between the primary piston and the driven member.

13. In a hydro-mechanical transmission device, a water-tight casing containing a constant volume of liquid, a water-tight primary cylinder communicating with the casing, a primary piston moving in the primary cylinder and acting on the constant volume of liquid, several driven members water-tight auxiliary cylinders communicating with the casing auxiliary pistons moving in these auxiliary cylinders and being in contact with the constant volume of liquid, continuous connecting members comprising levers hinged to small connecting rods themselves hinged to the primary piston in such manner as to form an angle alterable in shape, which permits relative movements of the primary piston with respect to the connecting lever and consequently to the corresponding secondary piston in such manner that this constant volume of liquid displaced under the action of the primary piston and acting through the auxiliary pistons on the connecting members produces automatically a determined ratio of transmission of movement between the primary piston and the various driven members, and, on the other hand, these various driven members, upon encountering different resistances, are adapted to be differently displaced so as to provide for taking up play and equalizing the forces involved.

GUSTAVE PROSPER GEORGES RIBIS.